Sept. 17, 1963 K. STEINBUCH 3,104,368

METHOD FOR THE AUTOMATIC IDENTIFICATION OF CHARACTERS, IN PARTICULAR PRINTED CHARACTERS (FIGURES, LETTERS, AND THE LIKE)

Filed May 22, 1958

3 Sheets-Sheet 1

INVENTOR.
K. Steinbuch
BY Robert Hardin Jr.
ATTORNEY

INVENTOR.
K. Steinbuch
BY
Robert Harding Jr.
ATTORNEY

Sept. 17, 1963 K. STEINBUCH 3,104,368

METHOD FOR THE AUTOMATIC IDENTIFICATION OF CHARACTERS, IN PARTICULAR PRINTED CHARACTERS (FIGURES, LETTERS, AND THE LIKE)

Filed May 22, 1958 3 Sheets-Sheet 3

INVENTOR.
K. Steinbuch
BY Robert Harding Jr.
ATTORNEY 3,104,368

METHOD FOR THE AUTOMATIC IDENTIFICATION OF CHARACTERS, IN PARTICULAR PRINTED CHARACTERS (FIGURES, LETTERS, AND THE LIKE)

Karl Steinbuch, Fellbach, Germany, assignor to International Standard Electric Corporation, New York, N.Y., a corporation of Delaware Filed May 22, 1958, Ser. No. 737,102
Claims priority, application Germany June 8, 1957
9 Claims. (Cl. 340—146.3)

The present invention relates to an automatic character recognition method.

In the course of applying automation to computing and similar process it is often desirable for visually readable characters to be read mechanically in order to control the corresponding equipments in the data-processing systems. This requirement has led to numerous proposals for the mechanical reading of letters and figures.

In some of the conventional methods the characters are photo-electrically scanned along definite horizontal and/or vertical lines for determining the black-white transitions. When the scanning lines are suitably selected criterions for the individual characters will result which represent a definite code. This encoding, however, is entirely arbitrary and, therefore, as a rule also difficult to survey. Instead of the optical scanning it has also been proposed to print the characters by means of an electrically conductive or magnetic ink, or the like, and to carry out the scanning operation along predetermined lines with the aid of corresponding sensing elements.

Another conventional scanning method consists in determining the contents of black within the type field. This however, under certain circumstances may result in criterions for the individual characters which are difficult to distinguish. A third type of character recognition method utilizes reference characters, but this method generally requires very bulky equipment.

Finally there is another method in which the shape of the characters is utilized as a distinguishing criterion. In this method, however, one faulty interruption or discontinuity in the shape of the character is noticed very disturbingly. In order to avoid faulty evaluations very complicated processes are usually required for determining that the interruption is not caused by the character itself.

The object of this invention is to provide an automatic character recognition apparatus adapted to identify printed characters. According to the invention the characters to be identified are imaged on a plate of insulating material provided with light-sensitive resistors (testing probes). The conductance or resistance values of the testing probes, whose geometrical shape and arrangement in the field of image are adapted to the characters in a suitable way for permitting an unambiguous identification, are applied to a corresponding evaluating circuit in which there is effected the assignment to the characters.

In this novel method, the fact that some materials, such as semi-conductive materials (selenium, cuprous-oxide, lead-sulphide, etc.) increase their electrical conductance upon illumination, (i.e. at the beginning linearly and thereupon quadratically) is made use of. This property is technically utilized in the so-called photo-resistors or light sensitive resistors. According to the invention a plurality of these resistors, each having a geometrical shape, serve as testing probes and are arranged on a plate of insulating material. The shape of the testing probes, as well as their number and arrangement, depend on what different kinds of characters which are to be identified exist, and what variaitons of the characters will have to be considered.

Thus, for instance, in the case of printed characters there will have to be taken into account any possible changes in size (type changes), and in the case of hand written characters one will have to reckon with possible distortions, twistings, and displacements.

It is appropriate to convert the obtained analogy values prior to the evaluation into digital values, especially into Yes-No statements. This may be accomplished in a simple way by comparing the analogy values with an adjustable threshold value, and all values lying above the threshold are regarded as Yes—("1"), and all values lying below are No—("0")—statements.

This comparison may be carried out in a bridge arrangement having the photo-resistor in one branch and a comparison-resistor in another, the diagonal of the bridge includes an amplifier comprising a changeover switch for both of said statements.

While for each testing probe there is provided one branch of the bridge arrangement, the third and fourth branch comprising a set of comparison resistors may be common to all amplifiers. The testing probes as chosen in the present example insure a good invariancy with respect to displacements and distortions.

In the following the invention will be described in particular with reference to FIGS. 1–5 of the accompanying drawings in which.

Figure 1:
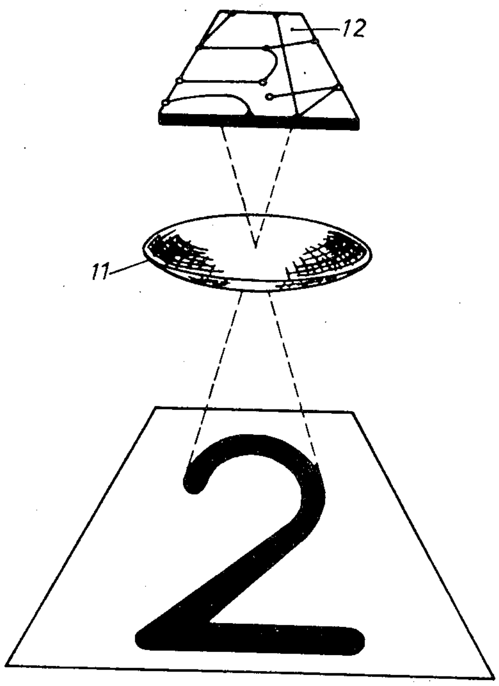
FIG. 1 is a schematic representation of an optical system which may be used with the invention.
Figure 2:
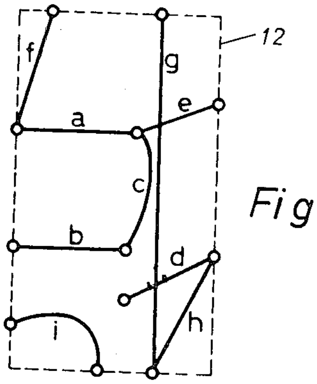
FIG. 2 is a plan view of the insulating plate with its light-sensitive resistors.

In FIG. 1, there is shown the figure 2 which, by means of the schematically represented optical system, is projected on to the plate of insulating material 12. On this plate 12 there are arranged several photo-resistors which act as testing probes, the arrangement and shape of which are chosen so that the figures 0 . . . 9 can be unambiguously identified. The photo-resistors are designated by the letter *a* . . . *i* (FIG. 2).

If a testing probe is brightly illuminated for its entire length, then it will have a high electrical conductance; however, if the projected shape of the figure to be identified merely intersects one of the probes, then the electrical conductance will drop off. In an evaluating circuit connected to the testing probes, it is then possible to determine whether the conductance lies below or above a definite limiting value and, consequently, whether the projected shape of the figure intersects the probe under consideration, or not. The evaluating circuit necessary to this end does not form part of the invention since it may be constructed in the conventional manner to meet the requirement of the present problem.

Figure 3:
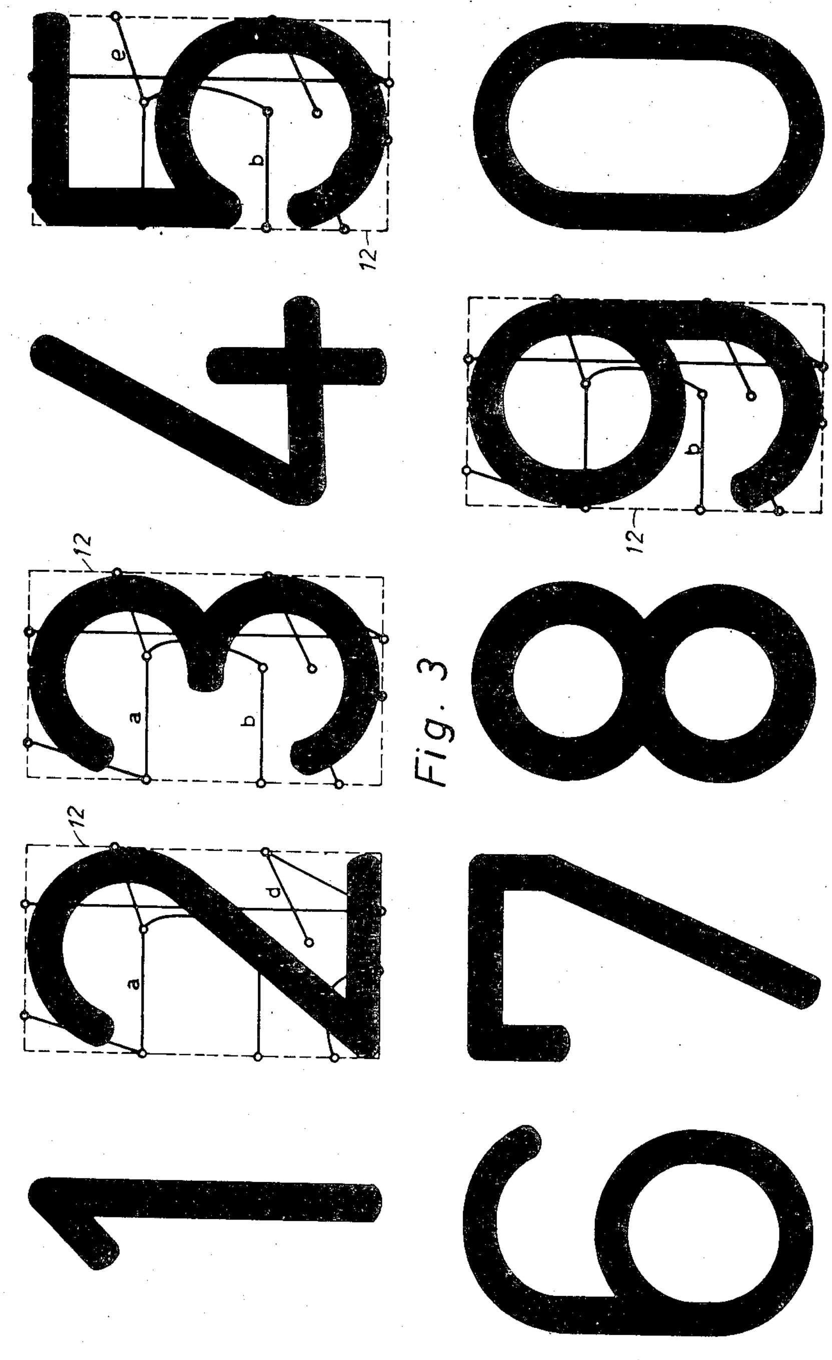
FIG. 3 shows the figures 1, 2 . . . 0 indicating the manner in which some of the figures affect the testing probes.

In FIG. 3 of the drawings there are shown the figures 1, 2 . . . 0, some of which are shown with the corresponding field of testing probes. In the following table a complete survey with respect to the position of the figures in the field of testing probes is shown.

*Testing Probes*

| Present Figure | *a* | *b* | *c* | *d* | *e* | *f* | *g* | *h* | *i* |
|---|---|---|---|---|---|---|---|---|---|
| 1 | ? | ? | ? | ? | ? | 1 | 1 | 1 | ? |
| 2 | 1 | ? | ? | 1 | 0 | ? | ? | 0 | 0 |
| 3 | 1 | 1 | 0 | 0 | 0 | ? | 0 | ? | ? |
| 4 | 0 | 0 | ? | ? | 1 | 1 | ? | 0 | 1 |
| 5 | 0 | 1 | 0 | 0 | 1 | ? | ? | ? | ? |
| 6 | 0 | 0 | 0 | 0 | 1 | ? | 0 | ? | 0 |
| 7 | 1 | ? | ? | ? | 0 | 0 | 0 | 1 | ? |
| 8 | 0 | 0 | 0 | 0 | 0 | ? | 0 | ? | ? |
| 9 | 0 | 1 | 0 | 0 | 0 | ? | 0 | ? | 0 |
| 0 | 0 | 0 | 1 | 0 | 0 | ? | 0 | ? | 0 |

The figure "1" in the above table means that the corresponding testing probe has a high conductance, while the figure "0" indicates that a low conductance exists. The question marks indicate that the statement "0" or "1" depend on small displacements or changes in the figures, and that therefore, this statement should not be used in the interest of a reliable figure identification. However, as will be seen in the table an unambiguous identification without these statements is possible.

In order to make the statements of the circuit arrangement to a high extent invariant with respect to changes in types, displacements, etc. several testing probes may be used for one and the same statement. Thus, for instance, according to FIGS. 2 and 3 the testing probe *e* is adapted to test whether an "opening" exists towards the upper right (in the case of the figures 4, 5, and 6) or whether no "opening" exists at the upper right (figures 2, 3, 7, 8, 9 and 0). In case the present figure is somewhat twisted, displaced or not written clearly then, with respect to the figures 4, 5, or 6, the probe *e* may be intersected by the figure shape. The inventive method offers the possibility of alleviating this problem by using a number of testing probes, whose paths slightly deviate from one another for one criterion. The connected circuit arrangement will then evaluate whether at least one of these testing probes has the conductance "1" or "0" respectively. As far as the recognition of type characters strongly differing from each other is concerned it may often be necessary to evaluate, under certain circumstances a great number of testing probes. In those cases it is appropriate to split the path of the light by means of semi-transparent layers, prisms, etc. so that the figure to be identified may be projected concurrently on to several test plates.

Figure 4:
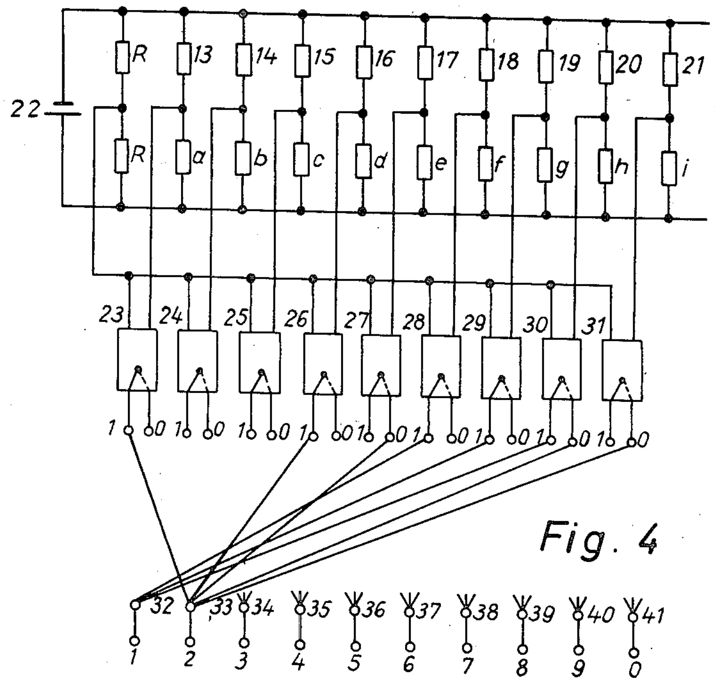
FIG. 4 is a schematic representation of a circuit for evaluating the condition of the probe.

In FIG. 4 of the drawings there is shown an example of the electrical total circuit arrangement serving the evaluation of the testing results. The photo-resistors *a . . . i* are respectively connected via series resistances 13–21 across the common source of D.C. voltage 22. The connecting points between the photo-resistors and their series resistances are respectively connected with amplifiers 23–31. In parallel with all of the photo-resistors two fixed resistors R are connected the connecting point of which is connected together with all of the amplifiers employed. Thus for each testing probe a bridge arrangement will result whose one branch contains the photo-resistor, and whose other branch contains the two resistors R. By means of a voltage comparison it will now be possible to determine whether the statement "0" or "1" exists, and correspondingly actuate a changeover switch in the amplifier for marking either the output "0" or "1." The outputs of the amplifier, in accordance with the table, are wired in such a way to the ten coincidence gating networks (coincidence gates) 32–41 that at the outputs of the coincidence gates the identified figures 0 . . . 9 will be marked.

In order to obtain a certain invariancy with respect to fluctuations of the brightness of the background it may be useful, in some cases, to derive the reference voltage for the probe amplifiers not from the fixed resistances, but from a testing probe which is never cut or intersected by the character shape, inserted into the branch of comparison. In this way, in the case of fluctuations regarding the degree of remission of the character supporting means, the amplitude threshold for the probe amplifiers will be varied in the proper sense.

In the example described, for the purpose of enabling a better understanding of the invention, it has been assumed that the figure to be identified has been projected in a centered manner in the field of testing probes. This however, is not the case as a rule, so that the actual identification must be preceded by a centering process. According to a further embodiment of the invention the centering may also be accomplished with the aid of correspondingly arranged testing probes.

Figure 5:
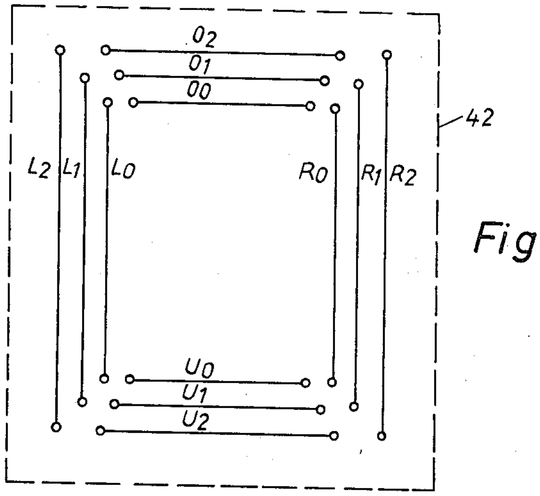
FIG. 5 is a plan view of a centering plate which may be used with the invention.

To this end the figure, in addition to being projected on to the test plate is also projected on to the centering plate 42 as shown in FIG. 5. This plate contains the testing probes $U_0 \ldots 2$, $L_0 \ldots 2$, $O_0 \ldots 2$ and $R_0 \ldots 2$, which are arranged at equally spaced relations and which are responsive to translatory displacements. For instance, when the projected figure cuts or intersects the testing probe $U_0 \ldots 2$, but not $O_0 \ldots 2$, then this means that the figure is displaced downwardly. By measuring the conductances electrical characteristics will be obtained which are capable of causing a displacement of the figure horizontally and vertically with respect to the imaging system 11 in a corresponding regulating arrangement. The centering may be regarded as successful whenever the limiting line between the cut and the non-cut testing probes is the same on the left and on the right, as well as above and below. The centering plate may also be combined with the plate 12.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Apparatus for the identification of characters comprising a plate of insulating material, light sensitive resistors each of a predetermined shape arranged in a predetermined line configuration on said plate, means for imaging a character to be identified on said plate, evaluating means for each light sensitive resistor comprising three predetermined resistors serially connected to the light sensitive resistor in a bridge arrangement, means for producing a potential across one diagonal of the bridge, current determining means in series with the other diagonal of the bridge; and gate means for each character to be identified coupled to predetermined ones of the current determining means.

2. Apparatus as claimed in claim 1, in which the current determining means comprises an amplifier with a bidirectional switch for ascertaining a threshold value of current in a yes-no statement.

3. Apparatus as claimed in claim 1, in which two of the predetermined resistors in the bridge arrangement are common to all of the bridge arrangements.

4. A device for character identification comprising a body of insulating material, a plurality of parallel bridge circuits each including in one leg thereof a light sensitive resistor disposed in a predetermined line configuration on the surface of said body to cover a given area of said body, in series with a separate fixed resistor, said bridge circuits having a common leg in parallel with all of said one legs, said common leg comprising a series pair of identical resistors, means for individually comparing the electrical potential at the junction of said identical resistors to the potentials at the junctions of the said light sensitive and fixed resistors in the said one legs; and means coupled to said comparing means for evaluating the combined output signals thereof.

5. Apparatus for the automatic identification of characters comprising an insulating plate, a plurality of light-sensitive resistors arranged in predetermined line patterns on said plate, means for imaging a character to be identified on said plate, a source of potential, means for connecting said resistors across said source to vary the current flowing in said line patterns in accordance with the amount of light falling on the said resistors in said patterns, a gate for each character to be identified, and evaluating means for coupling different combinations of said resistors to each gate, said resistors having such a geometrical shape and arrangement and the combinations thereof being connected in such a manner to said gates as to permit an unambiguous identification of a character imaged upon said plate, said evaluating means including means establishing a threshold value for the amount of current flowing in a resistor, means for comparing the value of actual current flowing in a resistor with said threshold value so as to deliver a "yes" or "no" signal to the gate with which said resistor is coupled, a bridge for each said resistor, the resistor being connected in one branch of the bridge, a pair of comparison resistors in the other branch, and an amplifier comprising a changeover switch with a "yes" output and a "no" output in the diagonal of the bridge for switching to either one or the other of said outputs.

6. An arrangement as claimed in claim 5, in which the branch of the bridge arrangement comprising the comparison resistances is provided in common for all amplifiers.

7. An arrangement as claimed in claim 5, in which said comparison resistances have fixed values.

8. An arrangement as claimed in claim 5, in which one of the light-sensitive resistors is arranged on the plate in the scanning field in such a way that it cannot be cut or intersected by any character.

9. Apparatus for the identification of characters comprising a plate of insulating material, means for imaging a character to be identified on said plate, a plurality of discrete elongated elements of photoresistive material irregularly disposed on said plate, each said element extending in transverse relation to corresponding line portions of certain ones of the characters imaged thereon by said imaging means, and means electrically connected to all of said photoresistive elements and responsive to the combination of resistances thereof to produce an output representative of the character imaged thereon.

References Cited in the file of this patent

UNITED STATES PATENTS

| | | |
|---|---|---|
| 2,421,012 | Chew | May 27, 1947 |
| 2,571,164 | Rines | Oct. 16, 1951 |
| 2,682,043 | Fitch | June 22, 1954 |
| 2,723,308 | Vroom | Nov. 8, 1955 |
| 2,741,312 | Johnson | Apr. 10, 1956 |
| 2,838,602 | Sprick | June 10, 1958 |
| 2,879,405 | Pankove | Mar. 24, 1959 |
| 2,924,812 | Merritt et al. | Feb. 9, 1960 |
| 2,964,734 | West | Dec. 13, 1960 |
| 2,995,741 | Kazan | Aug. 8, 1961 |